(12) United States Patent
Schwalbe et al.

(10) Patent No.: US 10,499,562 B2
(45) Date of Patent: Dec. 10, 2019

(54) RINSE TANK CUTOUT AND HOSE ROUTING

(71) Applicant: CNH Industrial America LLC, New Holland, PA (US)

(72) Inventors: Blaine Schwalbe, Valders, WI (US); Ross Christiansen, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 177 days.

(21) Appl. No.: 15/657,819

(22) Filed: Jul. 24, 2017

(65) Prior Publication Data

US 2019/0021222 A1 Jan. 24, 2019

(51) Int. Cl.
*A01C 23/00* (2006.01)
*A01M 7/00* (2006.01)

(52) U.S. Cl.
CPC ......... *A01C 23/008* (2013.01); *A01M 7/0085* (2013.01)

(58) Field of Classification Search
CPC . A01C 23/008; A01M 7/0082; A01M 7/0085; E02F 9/2275
USPC ....................... 137/355.12, 355.16
See application file for complete search history.

(56) References Cited

U.S. PATENT DOCUMENTS

| | | | |
|---|---|---|---|
| 4,135,596 A * | 1/1979 | Silba | B60P 3/2265 137/355.16 |
| 5,816,499 A | 10/1998 | Christiansen | |
| 6,155,497 A | 12/2000 | Hudson, Jr. et al. | |
| 6,942,163 B2 | 9/2005 | Engelbrecht | |
| 7,857,351 B2 * | 12/2010 | Edwards | B62J 35/00 220/4.14 |
| 8,025,245 B2 | 9/2011 | Truan et al. | |
| 8,505,976 B2 | 8/2013 | Ringer et al. | |
| 8,640,972 B2 | 2/2014 | Otto et al. | |
| 8,668,173 B2 | 3/2014 | Knobloch | |
| 9,045,039 B2 | 6/2015 | Ringer et al. | |

FOREIGN PATENT DOCUMENTS

| | | |
|---|---|---|
| CN | 104642283 | 5/2015 |
| DE | 10148422 A1 | 4/2003 |
| DE | 202007012045 U1 | 12/2007 |
| EP | 0862855 | 9/1998 |
| GB | 2319825 A | 6/1998 |
| WO | 9429599 | 12/1994 |

* cited by examiner

*Primary Examiner* — Marina A Tiet Jen
*Assistant Examiner* — Paul J Gray
(74) *Attorney, Agent, or Firm* — Rebecca L. Henkel; Rickard K. DeMille

(57) ABSTRACT

A rinse tank for use with an agricultural machine that has a routing tunnel formed in a tank bottom wall for routing hoses through the routing tunnel between the rinse tank and a frame side-rail associated with the agricultural machine. The routing tunnel allows hoses to be routed from a first end of the agricultural machine to a second end of the agricultural machine. Additionally, brackets can be installed to the top wall of the frame side-rail. The brackets can be used to help locate the rinse tank about the frame as they are configured to fit within the routing tunnel. Additionally, the hoses can be routed through the brackets to prevent the hoses from being misplaced or damaged once the rinse tank is installed onto the frame side-rail.

17 Claims, 9 Drawing Sheets

RINSE TANK CUTOUT AND HOSE ROUTING

FIELD OF THE INVENTION

The invention relates generally to agricultural product application equipment or agricultural machines such as self-propelled sprayers and, in particular, to a tank that overlies a frame side rail, where the tank has a cutout that provides a passage through which hoses used with the self-propelled sprayer can be routed.

BACKGROUND OF THE INVENTION

High-clearance sprayers are getting larger and more complex to allow for increasing coverage in a single pass, which improves application efficiency. These high-clearance sprayers require numerous hoses, tubes, and the like for hydraulic systems and wet systems that include liquid product and rinse liquid dispensing capabilities. Many of these hoses have to be routed long distances along the length of the sprayer. However, toward the back of the sprayer, this can be difficult because the rinse tank extends across the entire width of the frame and is supported by the frame.

Traditionally, these hoses are mounted to the sprayer using numerous hose support brackets and hangers that hold the hoses outside of frame rails, inside of frame rails, and/or hanging below the belly of the sprayer in order to route the hoses past the rinse tank. This can require extra lengths of hose to extend along indirect routing paths and can require numerous brackets and hangers to adequately support the hoses, which can add cost and time to assembly procedures. Furthermore, when the hoses hang outside of the frame rail or below the belly of the sprayer, there is risk that the hoses might catch onto objects, which could damage the hoses or disengage them from the sprayer.

SUMMARY OF THE INVENTION

A tank carried by an agricultural machine, such as a sprayer, with a tank outer wall, a tank inner wall, and a tank bottom wall is configured to provide a hose routing system through a routing tunnel. The tank outer wall faces outwardly from the agricultural machine, and the tank inner wall is located opposite the tank outer wall to face inwardly towards the agricultural machine. The tank bottom wall extends between and connects the tank outer wall and the tank inner wall, and faces downwardly toward a frame side-rail of the agricultural machine. The routing tunnel extends into and defines a depression that is formed in the tank bottom wall. As a result, the routing tunnel and the frame side-rail enclose a plurality of hoses, tubes, and the like that extend from a first location beyond a first end of the routing tunnel and a second location beyond a second end of the routing tunnel. More specifically, the plurality of hoses can be routed through the routing tunnel between the tank and the frame side-rail from a first end of the agricultural machine to a second end of the agricultural machine.

According to an aspect, the bottom wall can define a multi-tiered cross-sectional profile to accommodate the tank about the frame side-rail. This multi-tiered cross-sectional profile can include an inner bottom wall section located adjacent to the tank inner wall, and an outer bottom wall section located adjacent to the tank outer wall. The outer bottom wall section can also overlay and extend along a portion of a top wall of the frame side-rail. Additionally, the routing tunnel can have a tunnel top wall with a pair of tunnel side walls extending downwardly on either side of the tunnel top wall to define a channel that corresponds to an outer periphery of the depression formed in the tank bottom wall. The depression can take the form of a generally U-shaped passage. Thus, the tunnel top, the pair of tunnel side walls, and the top wall of the frame side-rail enclose a longitudinal passage that extends through the routing tunnel. The plurality of hoses can then be extended through the longitudinal tunnel.

According to another aspect, the inner bottom wall can include a horizontal lower segment, a first upright side segment, and a second upright side segment. The first upright side segment extends upwardly from one side of the horizontal lower segment to the outer bottom wall section. Once the rinse tank is installed, the first upright side segment faces toward a side of the frame side-rail of the agricultural machine. The second side segment extends upwardly from the other side of the horizontal lower segment to the tank inner wall. Additionally, the inner bottom wall section can have a first curved end and a second curved end located opposite the first curved end. The first curved end is defined by a first curved end segment that extends along an at least partially curved path between the first upright side segment and the second upright side segment at a first end of the inner bottom wall section. This allows the first curved end to be configured to nest with a first curved edge of the frame. The second curved end is defined by a second curved end segment that extends along an at least partially curved path between the first upright side segment and the second upright side segment at a second end of the inner bottom wall section. This allows the second curved end to be configured to nest with a second curved edge of the frame.

According to yet another aspect, a plurality of brackets can be mounted to the top wall of the frame side-rail of the agricultural machine. These brackets can nest within the depression, which allows the tank to be aligned appropriately with the frame. Additionally, the plurality of hoses can be routed through the plurality of brackets. Alternatively, the plurality of hoses can simply be supported by the top wall of the frame side-rail.

In another aspect, the outer bottom wall section can have a base on one side of the depression extending between the routing tunnel and the tank outer wall and a lip on the other side of the depression extending between the routing tunnel and the inner bottom wall section. In this way, the base and the lip are supported by the top wall of the frame side-rail when the rinse tank is installed. More specifically, the base is supported by an outer portion of the top wall of the frame side-rail and the lip is supported by an inner portion of the top wall of the frame side-rail.

According to another aspect, the tank may include a top section and a bottom section, where the bottom section is supported by the frame of the agricultural machine. As discussed above, the tank may also have a tank outer wall and a tank inner wall. The tank inner wall can have an inner wall upper segment arranged at the top section of the tank, an inner wall lower segment arranged at the bottom section of the tank, and a curved inner wall extending between the inner wall upper and lower segments. The curved inner wall can extend along a curved path to present a concave surface of the inner wall towards a longitudinal axis of the agricultural machine. The bottom section of the tank can also include an outer bottom wall section, an inner bottom wall section, a routing tunnel, a first curved end, and a second curved end as described above. Again, the shape of the first curved end and the second curved end correspond to and nest with first and second curved edges of the frame. The plurality of hoses is routed through the depression from a first end of the agricultural machine to a second end of the agricultural machine.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
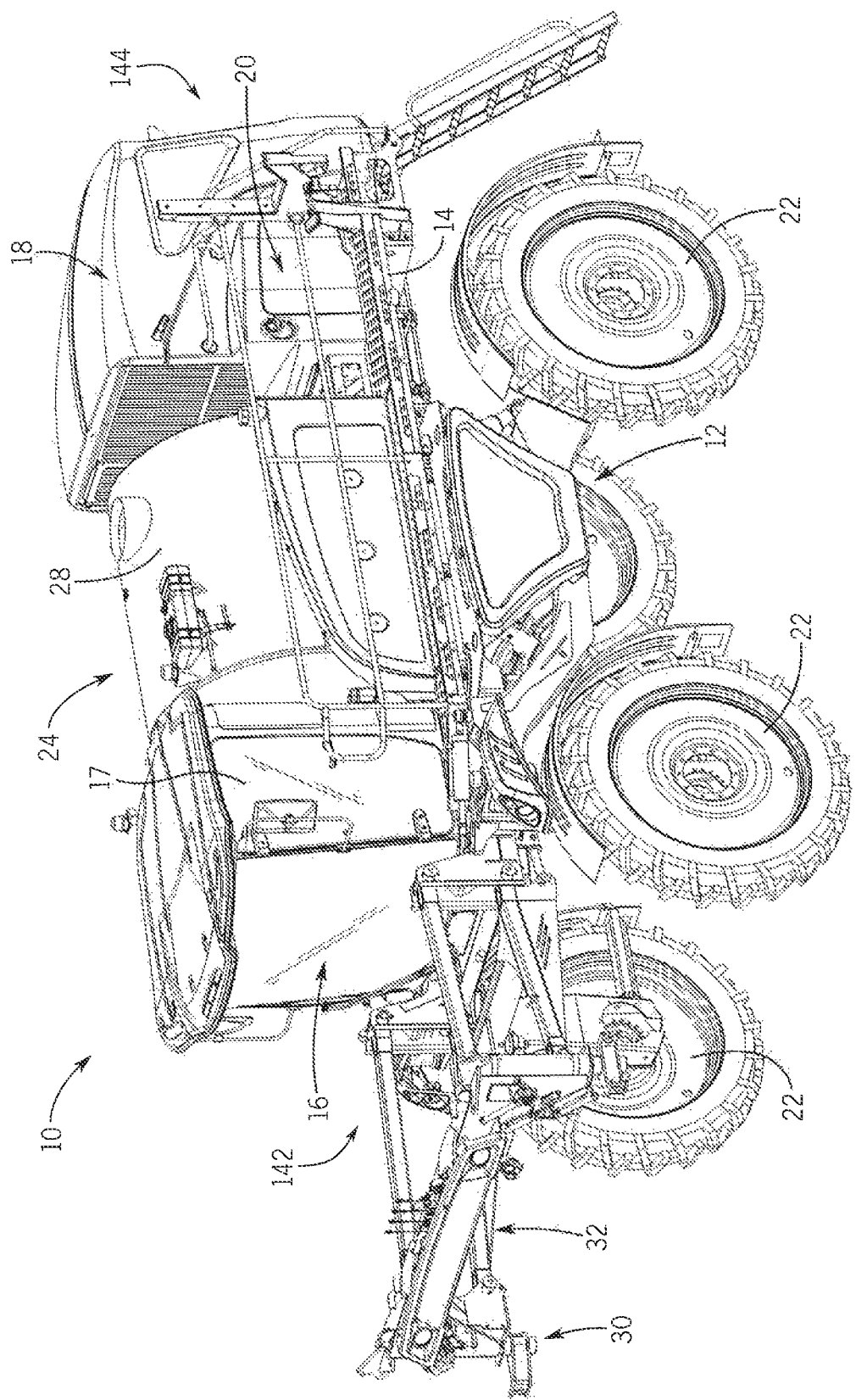
FIG. 1 is an isometric view of an agricultural machine.
Figure 2:
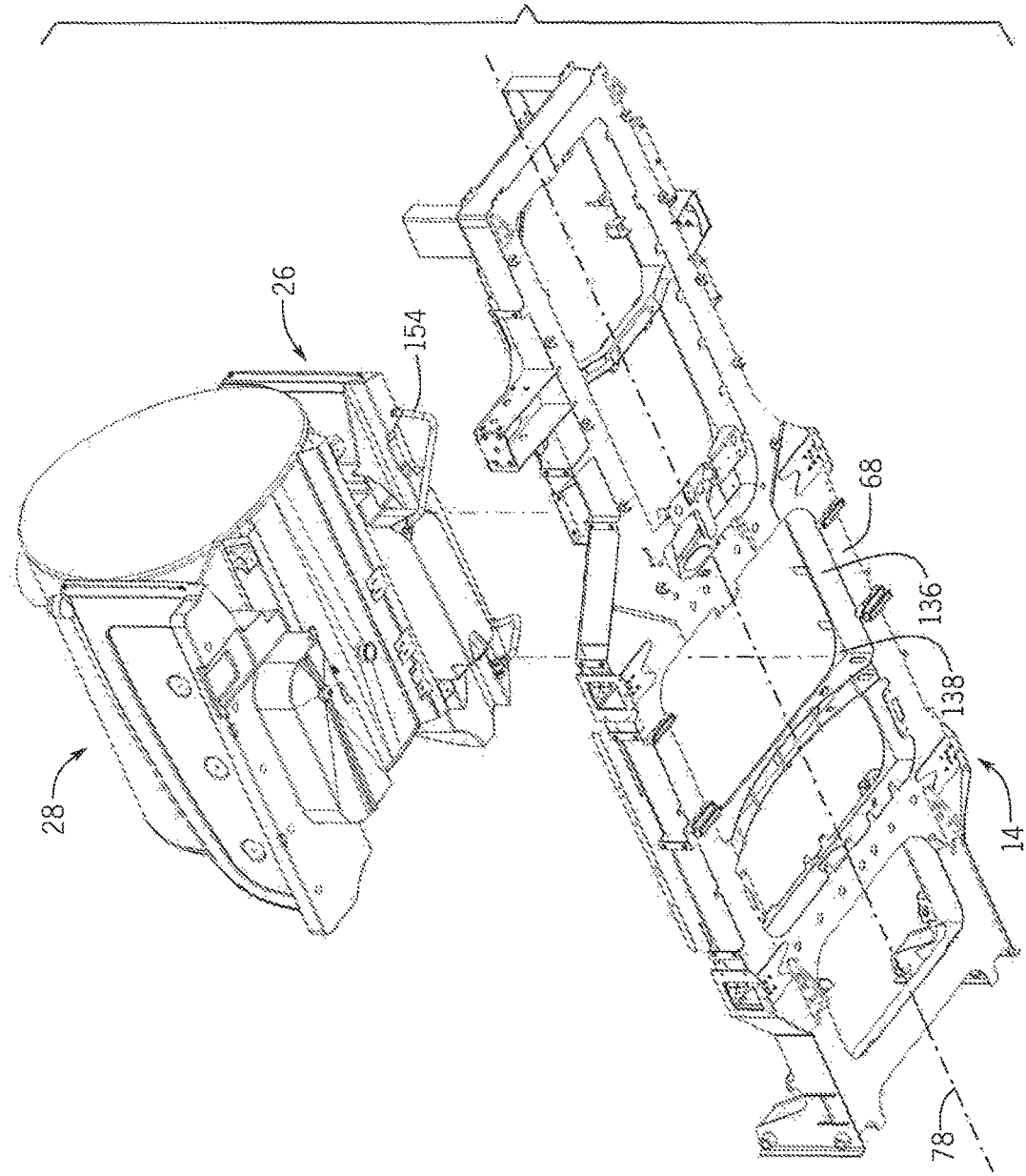
FIG. 2 is a bottom exploded isometric view of multiple tanks and a frame of the agricultural machine.
Figure 3:
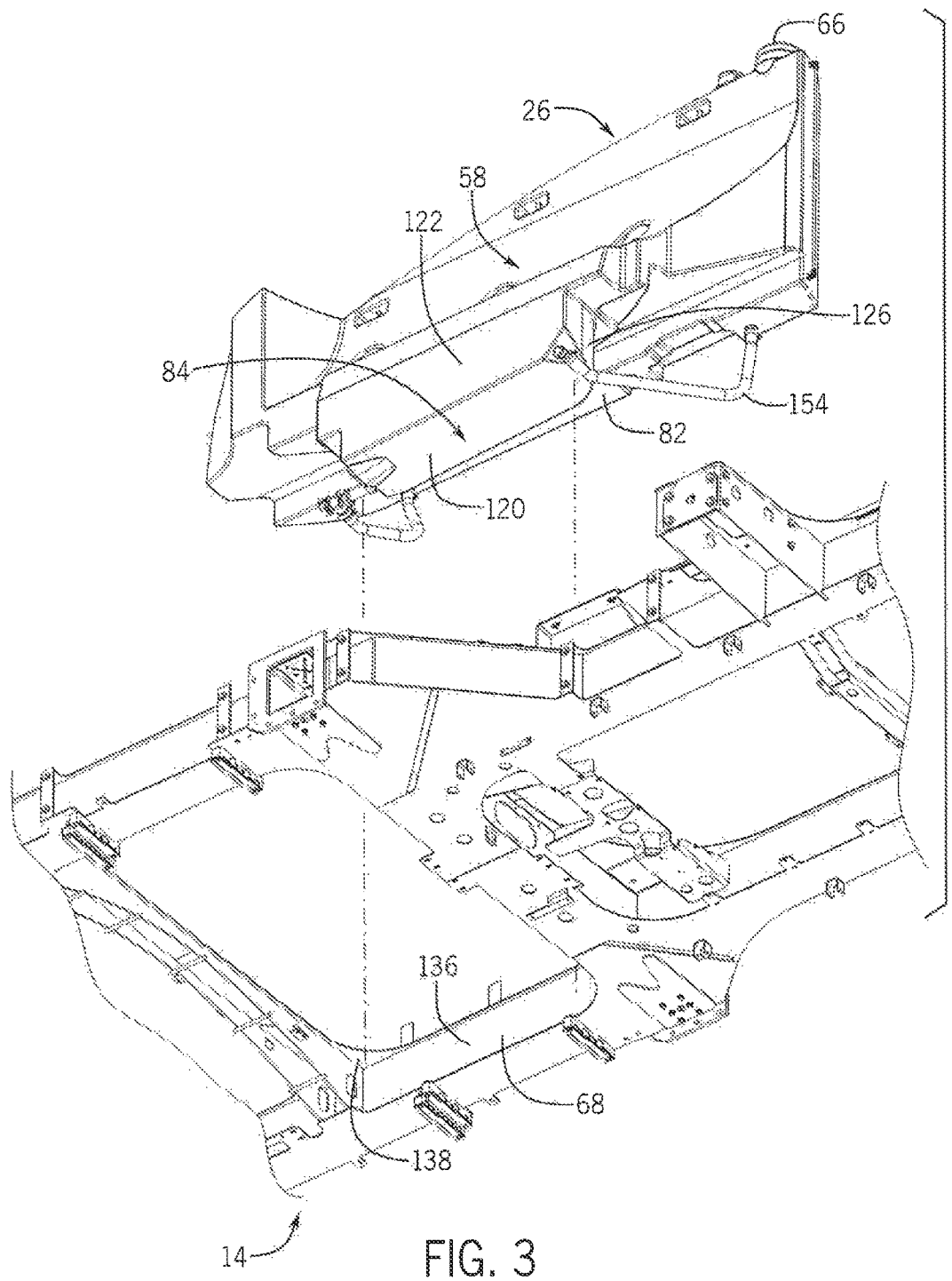
FIG. 3 is a bottom exploded isometric view of a tank with a hose routing system and the frame of the agricultural machine of FIG. 2.
Figure 4:
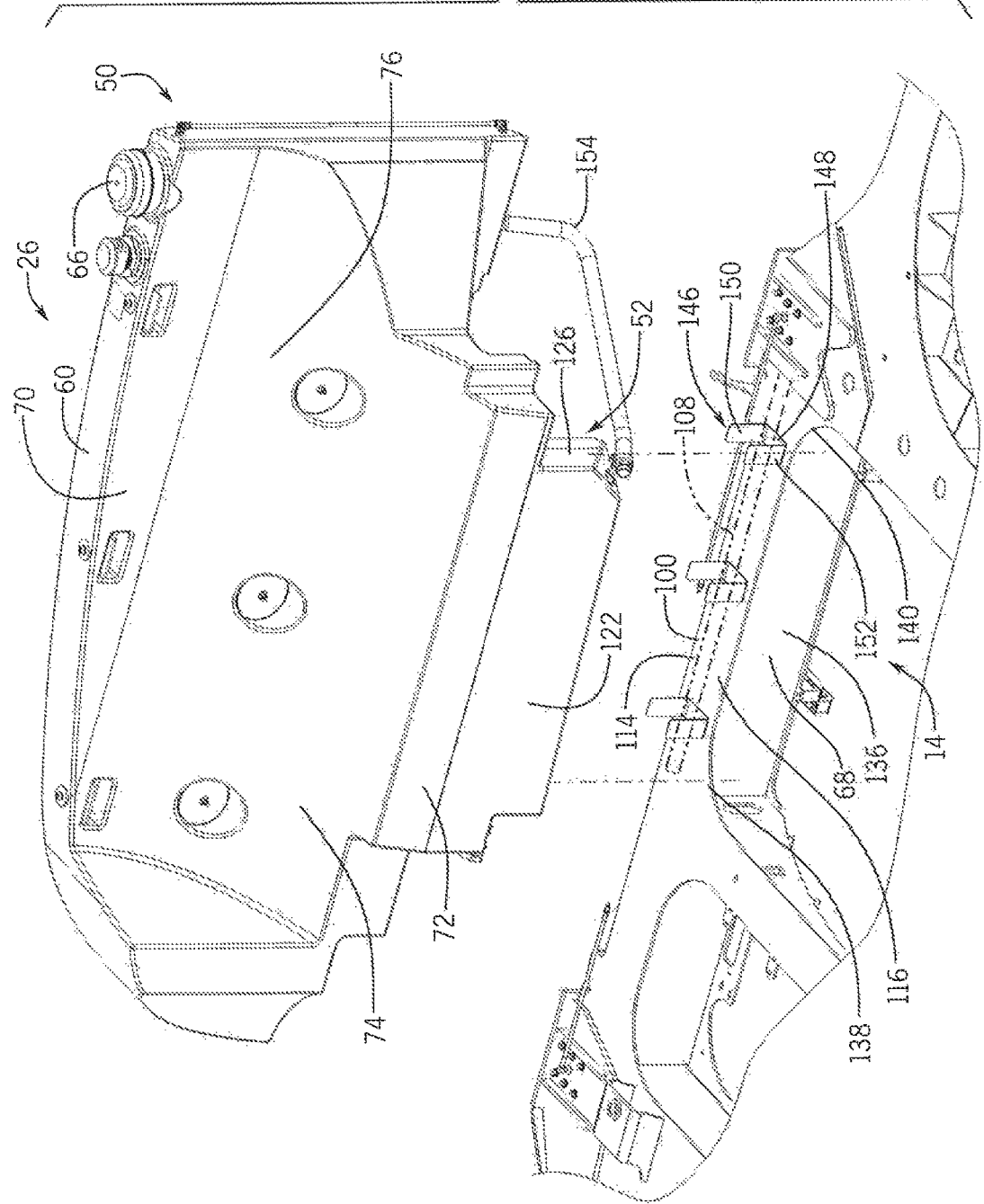
FIG. 4 is a top exploded isometric view of the tank with the hose routing system and the frame of the agricultural machine of FIG. 3.
Figure 5:
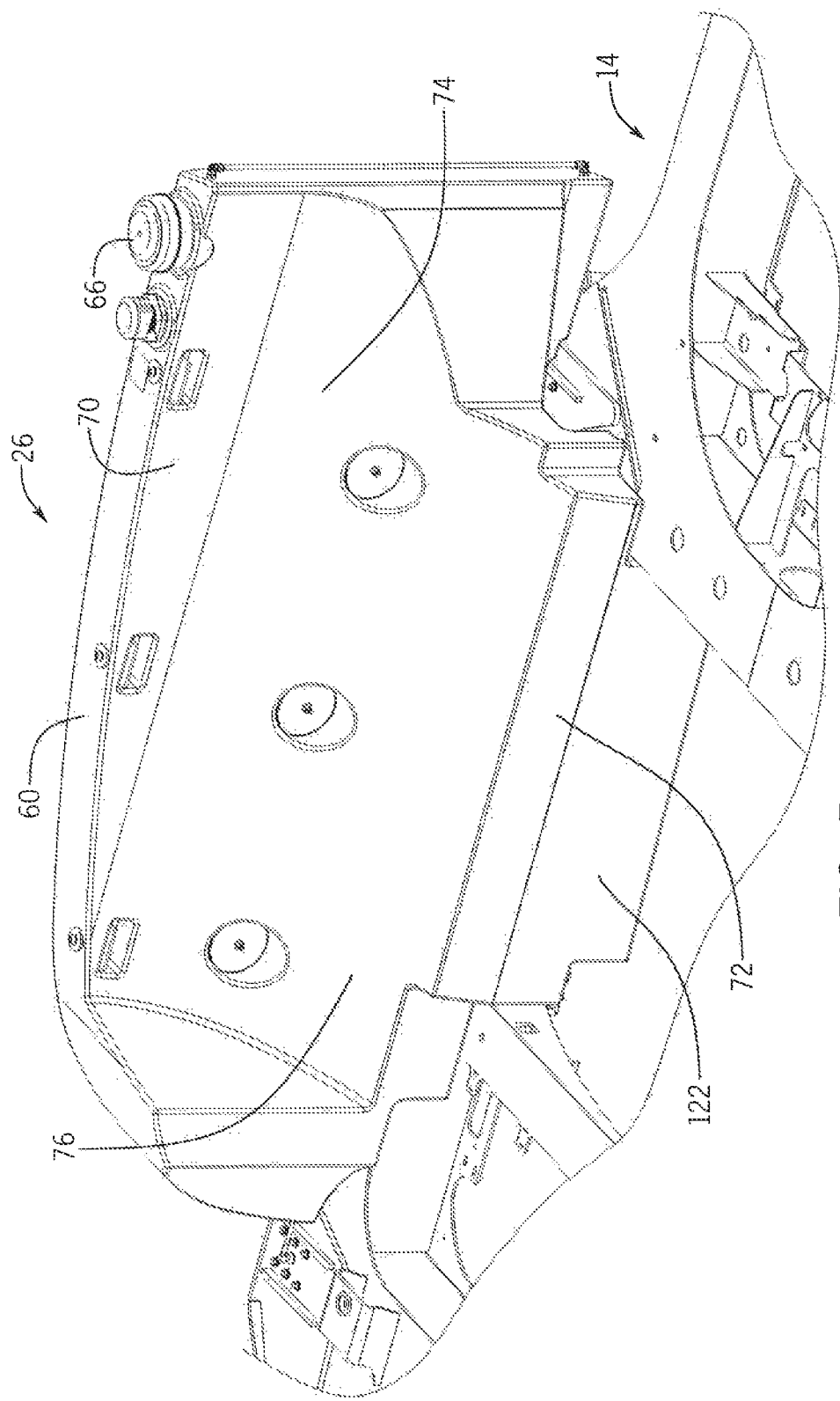
FIG. 5 is a top isometric view of the tank with the hose routing system installed onto the frame of the agricultural machine.
Figure 6:
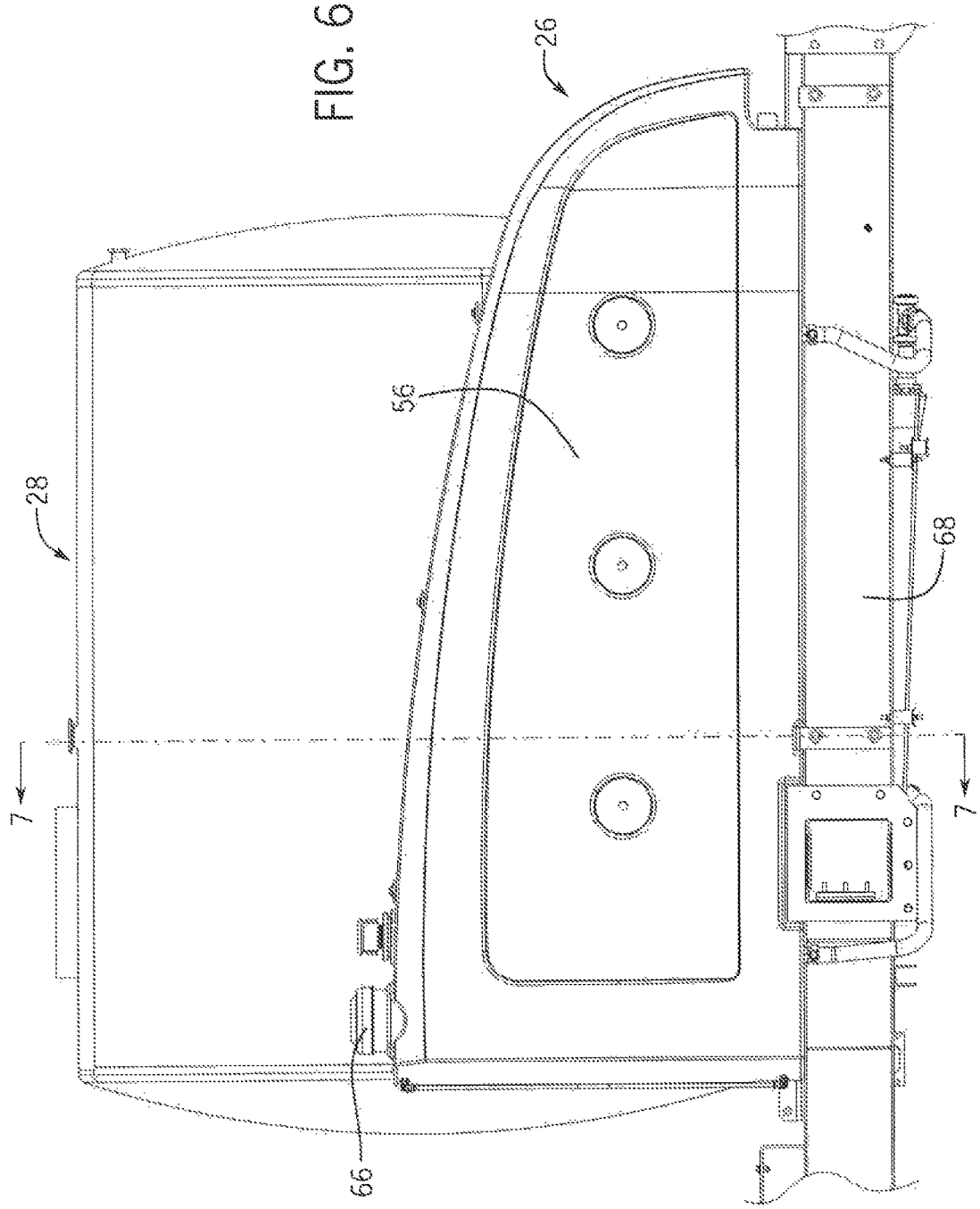
FIG. 6 is a side elevation view of the tank with the hose routing system installed onto the frame of the agricultural machine of FIG. 5.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and. New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16, an engine 18 and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings.

A spray system 24 can include storage containers such as rinse tank 26 for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is configured to move the boom 30 up and down for adjusting the height of application of the product.

The rinse tank 26 will now be described in greater detail. The rinse tank 26, as most clearly shown in FIGS. 7-9, can include a top section 50 and a bottom section 52 with a cavity 54 therebetween configured to store a rinse fluid (not shown). Once installed, the bottom section 52 is supported by the frame 14 of the sprayer 10. The tank 26 also has a tank outer wall 56 that faces outwardly from the sprayer 10 and a tank inner wall 58 located opposite the tank outer wall 56. The tank inner wall 58 faces inwardly towards the product tank 28. Additionally, a top wall 60 and a bottom wall 62 extend between the tank outer wall 56 and the tank inner wall 58.

The top wall 60 includes a number of openings 64 and twist tops 66 that can easily be secured or removed to the openings 64 to allow the rinse tank 26 to be refilled. The tank outer wall 56 extends straight downwardly from the top wall 60. In this way, the tank outer wall 56 can be substantially flush with a frame side-rail 68 when the rinse tank 26 is installed.

The tank inner wall 58 also extends downwardly from the top wall 60, and can have an inner wall upper segment 70 arranged at the top section 50 of the rinse tank 26 and an inner wall lower segment 72 arranged at the bottom section 52 of the rinse tank. 26. Additionally, the tank inner wall 58 can have a curved inner wall intermediate segment 74 that extends between the inner wall upper segment 70 and the inner wall lower segment 72 along a curved path. This curved inner wall intermediate segment 74 forms a concave surface 76 toward a longitudinal axis 78 of the sprayer 10. As a result of the shape of the curved inner wall intermediate segment 74, the rinse tank 26 is compatible with the cylindrical shape of the product tank 28. In this way, when installed, the rinse tank 26 is secured between the frame side-rail 68 and the product tank 28.

The bottom section 52 of the tank 26 has a tank bottom wall 62. The tank bottom wall 62 has a multi-tiered cross-sectional profile, which can include an outer bottom wall section 82 and an inner bottom wall section 84. The outer bottom wall section 82 extends inwardly at a right angle from the outer wall 56 toward the longitudinal axis 78 of the sprayer 10. The inner bottom wall section 84 is offset from the outer bottom wall section 82, and extends from the outer bottom wall section 82 towards the longitudinal axis 78 of the sprayer 10. Additionally, a routing tunnel 86 extends into and defines a depression 88 that is formed in the outer bottom wall section 82.

Figure 7:
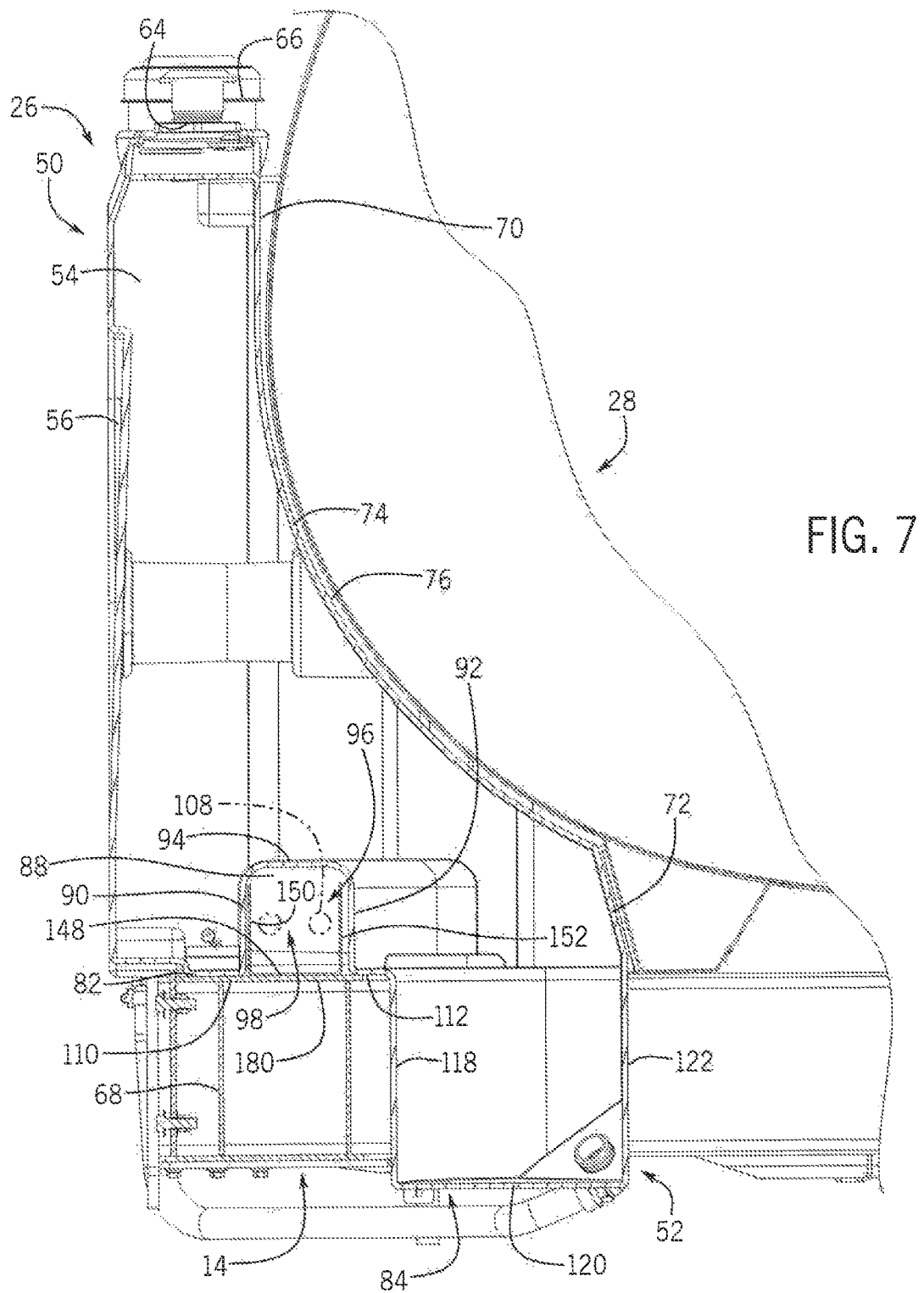
FIG. 7 is a cross sectional side elevation view of the tank with the hose routing system installed onto the frame of the agricultural machine, taken generally along line 7-7 of FIG. 6.
Figure 8:
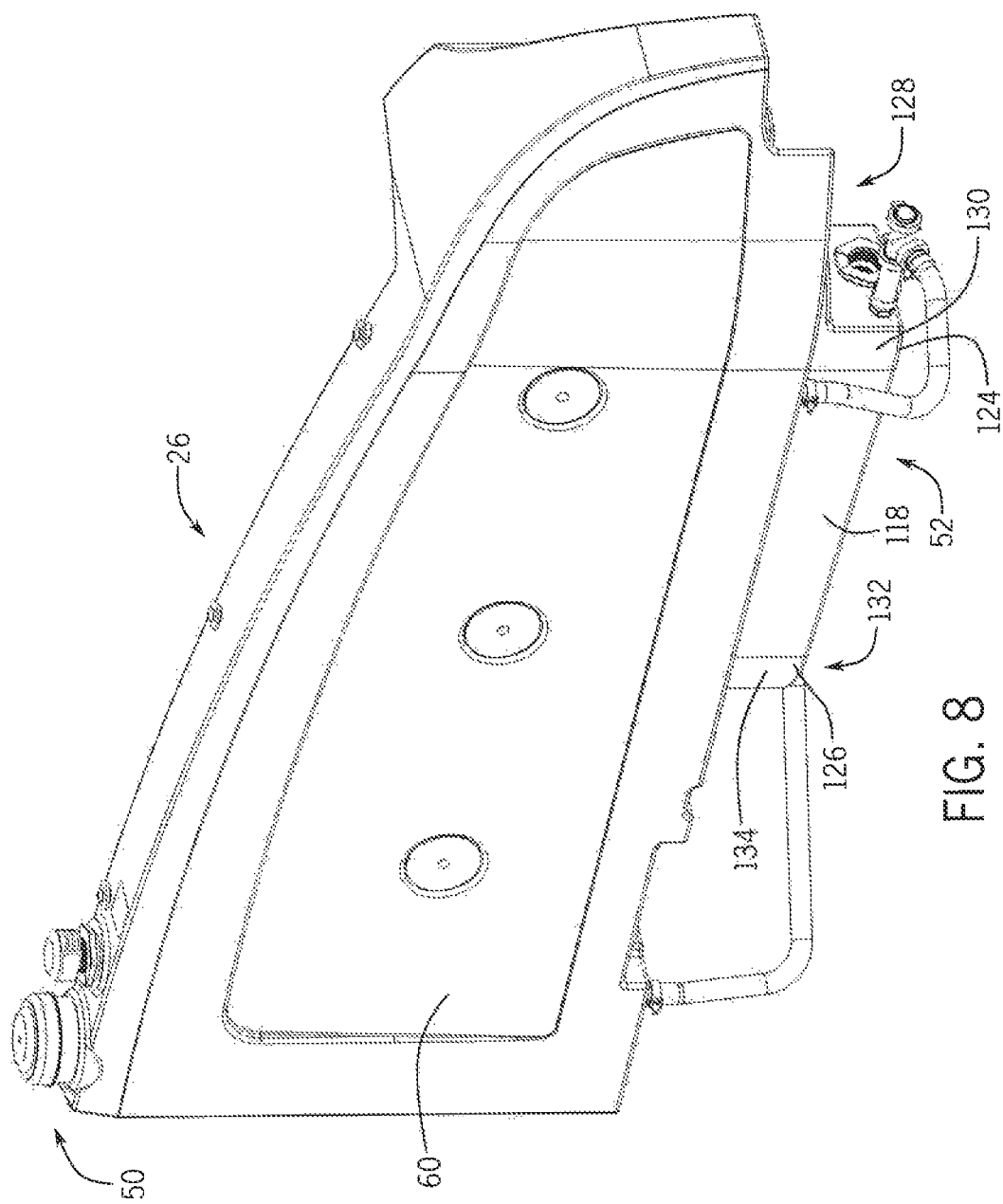
FIG. 8 is a top isometric view of the tank with the hose routing system.

Looking to the cross-sectional view in FIG. 7, the routing tunnel 86 has a first tunnel side wall 90 and a second tunnel side wall 92, both of which extend upwardly from the outer bottom wall section 82. A tunnel top wall 94 extends between the first tunnel side wall 90 and the second tunnel side wall 92. As a result, a channel 96 is defined between the first and second tunnel side walls 90, 92 and the tunnel top wall 94, where the channel 96 corresponds to an outer periphery of the depression 88 formed in the tank bottom wall 62. Additionally, these first and second tunnel side walls 90, 92 and top wall 94 form a longitudinal passage 98 with a top wall 100 of the frame side-rail 68. This longitudinal passage 98 extends through the routing tunnel 86.

Figure 9:
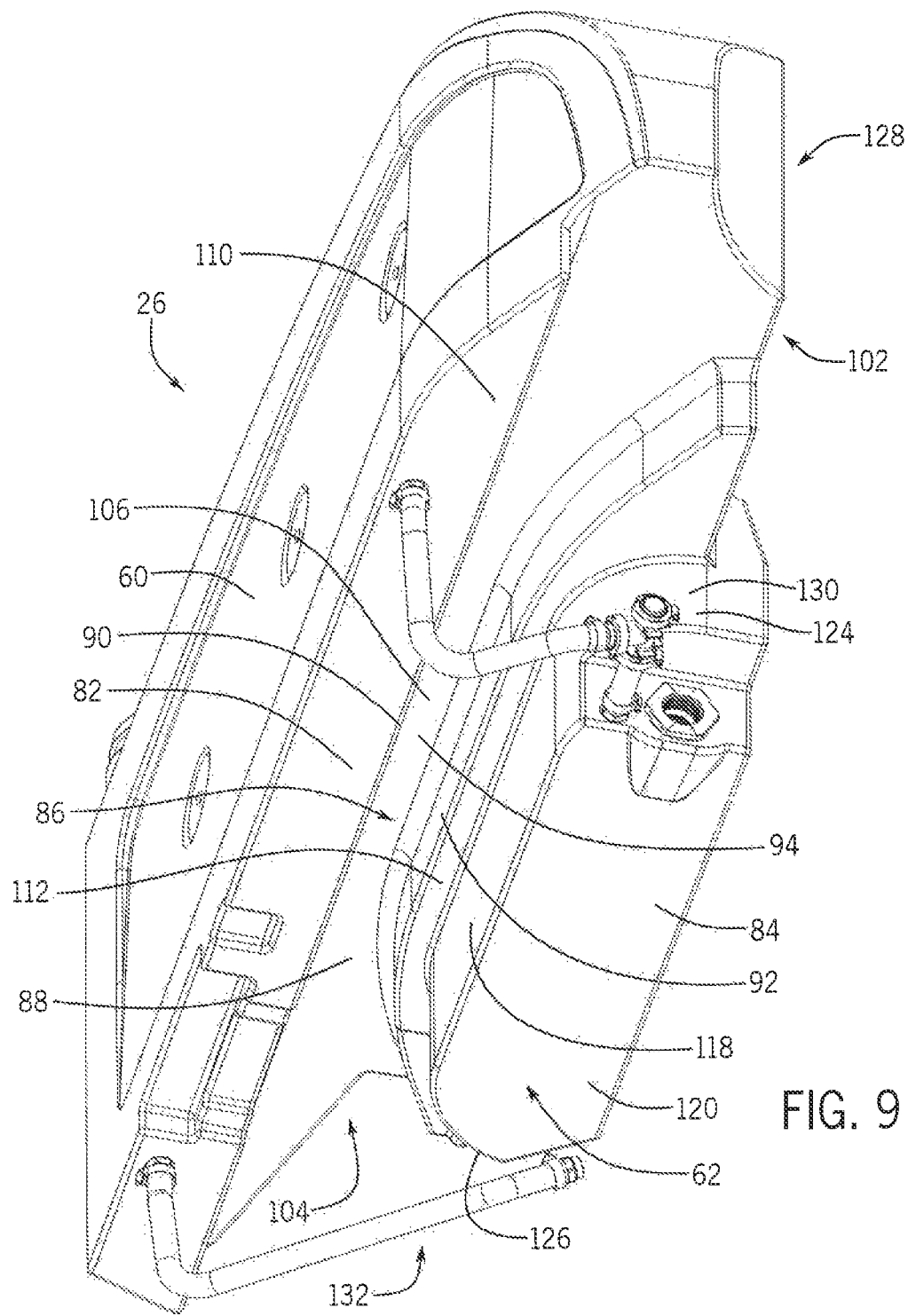
FIG. 9 is a bottom isometric view of the tank with the hose routing system of FIG. 8.

Turning next to FIG. 9, another vantage point of the routing tunnel 86 is shown. The routing tunnel 86 includes a first tunnel end 102, a second tunnel end 104, and tunnel intermediate section 106 located therebetween. The tunnel intermediate section 106 located between the first and second tunnel side walls 90, 92 is narrower in width than the width of the first tunnel end 102 and the second tunnel end 104. The first tunnel side wall 90 tapers inwardly towards the longitudinal axis 78 of the sprayer 10 at the ends, which results in the greater width at the first tunnel end 102 and the second tunnel end 104 in comparison to the tunnel intermediate section 106. As such, the routing tunnel 86 is substantially U-shaped. This allows hoses 108 to be routed in different directions at either of the first tunnel end 102 and the second tunnel end 104, but collected within the tunnel intermediate section 106.

Because the depression 88 splits the outer bottom wall section 82, the outer bottom wall section 82 has a base 110 and a lip 112 located on either side of the depression 88. As such, the base 110 extends between the routing tunnel 86 and the tank outer wall 56. The lip 112 extends between the routing tunnel 86 and the inner bottom wall section 84. When the rinse tank 26 is installed on the sprayer 10, both the base 110 and the lip 112 rest on, and are supported by, the top wall 100 of the frame side-rail 68. More specifically, the base 110 is supported by an outer portion 114 of the top wall 100 of the frame side-rail 68 and the lip 112 is supported by an inner portion 116 of the top wall 100 of the frame side-rail 68. By having both the base 110 and the lip 112 contact the frame side-rail 68, the rinse tank 26 can more securely be seated on the frame side-rail 68 when installed.

Additionally, the inner bottom wall section 84 can have a first upright side segment 118, a horizontal lower segment 120, a second upright side segment 122, a first curved end 124, and a second curved end 126. The first upright side segment 118 extends downwardly from the lip 112 of the outer bottom wall section 82 and the second upright side segment 122 extends downwardly from the inner wall lower segment 72. The horizontal lower segment 120 extends from the bottom of the first upright side segment 118 toward the longitudinal axis 78 of the sprayer to the bottom of the second upright side segment 122. The first curved end 124 is located at a first end 128 of the inner bottom wall section 84 and has a first curved end segment 130 that extends along an at least partially curved path between the first upright side segment 118 and the second upright side segment 122. The second curved end 126 is located at a second end 132 of the inner bottom wall section 84 opposite the first end 128, and is defined by a second curved end segment 134 that extends along an at least partially curved path between the first upright side segment 118 and the second upright side segment 122. As shown, the inner bottom wall section 84 is configured to be compatible with, and nest against the frame 14 of the sprayer 10. More specifically, the first upright side segment 118 is configured to face towards and abut a side wall 136 of the frame side-rail 68, the first curved end 124 is configured to abut a first curved edge 138 of the frame 14, and the second curved end 126 is configured to abut a second curved edge 40 of the frame 14. Again, this helps to ensure that the rinse tank 26 is properly and securely installed on the frame side-rail 68.

When the rinse tank 26 is installed on the frame 14, the outer bottom wall section 82 overlies and runs along a portion of the top wall 100 of the frame side-rail 68. As such, the top wall 100 of the frame side-rail 68 and the depression 88 form the channel 96 that extends along the length of the rinse tank 26. This channel 96 formed above the frame side-rail 68 and below the depression 88 allows hoses 108 to be routed through the channel 96 from a first location of the sprayer 10 to a second location of the sprayer 10. For instance, the channel 96 allows hoses 108 to be routed from a first end 142 of the sprayer 10 to a second end 144 of the sprayer 10. The hoses 108 can thus be supported by the top wall 100 of the frame side-rail 68. The U-shape of the depression 88 further helps to facilitate these hoses 108 where the first tunnel end 102 and the second tunnel end 104 will allow the hoses 108 to be routed in many different direction depending on what they connect to.

Additionally, a plurality of brackets 146 may be installed onto the top wall 100 of the frame side-rail 68. These brackets 146 may be equally spaced about the frame side-rail 68. While three brackets 146 are shown, additional brackets 146 could be included to improve the functionality of this sprayer 10. Each of the brackets 146 has a base 148 that is attached to the frame side-rail 68 and two sides 150, 152 extending upwardly from the base 148. These brackets 146 can serve multiple functions. First, the plurality of hoses 108 can be secured and routed within these brackets 146. This helps to ensure that the hoses 108 are correctly placed before the rinse tank 26 is installed. As a result, damage to hoses 108 that would occur if the hoses 108 were not appropriately placed can be avoided. Additionally, the brackets 146 are dimensioned to fit within the depression 88. More specifically, the sides 150, 152 of the bracket 146 are dimensioned to be spaced apart slightly less than the distance between the first side wall 90 and the second tunnel side wall 92 of the routing tunnel 86. Additionally, the height of the two sides 150, 152 is slightly less than the height of the first side wall 90 and the second tunnel side wall 92 of the routing tunnel 86. This helps to locate and align the rinse tank 26 about the frame 14 and more specifically the frame side-rail 68 when the rinse tank 26 is installed to the sprayer 10. Thus, when the rinse tank 26 is installed onto the frame 14, the plurality of brackets 146 nest within the routing tunnel 86.

Additionally, the rinse tank 26 can also have a plurality of tubes 154 that extend away from the rinse tank 26. As shown, there are two tubes 154 located on either end of the rinse tank 26. These tubes 154 can be used to dispense fluid such as water or other rinsing solutions out of the rinse tank 26. For instance, these tubes could be used to flush out hoses, tubes, and the like that are used to transport product distributed by the spray system 24. Preferably, the tubes 154 are located towards the bottom of the rinse tank 26 so that fluid will naturally flow down and out of the tubes 154 once they have been opened until the rinse tank 26 is empty.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A tank with a hose routing system carried by an agricultural machine, the tank comprising:
   a tank outer wall that faces outwardly away from the agricultural machine;
   a tank inner wall that faces inwardly toward the agricultural machine;
   a tank bottom wall that extends between and connects the tank outer and inner walls and faces downwardly toward a frame side-rail of the agricultural machine; and
   a routing tunnel that extends into and defines a depression formed in the tank bottom wall with the routing tunnel and the frame side-rail enclosing a plurality of hoses extending from a first location beyond a first end of the routing tunnel to a second location beyond a second end of the routing tunnel,
   wherein the bottom wall defines a multi-tiered cross-sectional profile that includes
      an inner bottom wall section arranged toward the tank inner wall; and
      an outer bottom wall section arranged toward the tank outer wall that overlies and extends along a portion of a top wall of the frame side-rail of the agricultural machine;
   wherein the routing tunnel includes a tunnel top wall and a pair of tunnel side walls extending downwardly from the tunnel top wall to collectively define a channel that corresponds to an outer periphery of the depression formed in the tank bottom wall with the tunnel top and side walls and the top wall of the frame side-rail enclosing a longitudinal passage that extends through the routing tunnel with the plurality of hoses extending through the longitudinal passage, and
   wherein the inner bottom wall section includes
      a horizontal lower segment;
      a first upright side segment extending upwardly from the horizontal lower segment of the inner bottom wall section to the outer bottom wall section; and
      a second upright side segment extending upwardly from the horizontal lower segment of the inner bottom wall section toward the tank inner wall;
   wherein the first upright side segment of the inner bottom wall section faces toward a side of the frame side-rail of the agricultural machine.

2. The tank of claim 1, wherein the inner bottom wall section further comprises:
   a first curved end defined by a first curved end segment that extends along an at least partially curved path between the first and second upright side segments at a first end of the inner bottom wall section; and
   a second curved end defined by a second curved end segment that extends along an at least partially curved path between the first and second upright side segments at a second end of the inner bottom wall section;
   wherein the first curved end is configured to nest with a first curved edge of the frame and the second curved end is configured to nest with a second curved edge of the frame.

3. The tank of claim 1, wherein the outer bottom wall section has a base on one side of the depression extending between the routing tunnel and the tank outer wall and a lip on the other side of the depression extending between the routing tunnel and the inner bottom wall section; and
   wherein the base and the lip are supported by a top wall of a frame side-rail with the base supported by an outer portion of the top wall of the frame side-rail and the lip supported by an inner portion of the top wall of the frame side-rail.

4. The tank of claim 1, further comprising a plurality of brackets mounted to a top wall of the frame side-rail of the agricultural machine.

5. The tank of claim 4, wherein the plurality of brackets nest within the depression; and
   wherein the plurality of hoses is routed through the plurality of brackets.

6. The tank of claim 1, wherein the plurality of hoses is supported by a top wall of a frame side-rail.

7. The tank of claim 1, wherein the plurality of hoses is routed through the routing tunnel between the tank and a frame side-rail from a first end of the agricultural machine to a second end of the agricultural machine.

8. The tank of claim 1, wherein the depression forms a U-shaped passage.

9. A tank with a hose routing system carried by an agricultural machine, the tank comprising:
   a top section and a bottom section with the bottom section of the tank supported by a frame of the agricultural machine;
   a tank outer wall that faces outwardly away from the agricultural machine; and
   a tank inner wall that faces inwardly toward the agricultural machine with the tank inner wall having inner wall upper segment arranged at the top section of the tank, an inner wall lower segment arranged at the bottom section of the tank, and a curved inner wall intermediate segment extending between the inner wall upper and lower segments along a curved path to present a concave surface of the inner wall toward a longitudinal axis of the agricultural machine;
   wherein the bottom section of the tank further comprises:
      a tank bottom wall arranged at the bottom section of the tank that includes an outer bottom wall section that extends inwardly from the tank outer wall toward the longitudinal axis of the agricultural machine and an inner bottom wall section that extends from the outer bottom wall section toward the longitudinal axis of the agricultural machine;
      a routing tunnel that extends into and defines a depression formed in the outer bottom wall section with the routing tunnel including a first tunnel side wall, a second tunnel side wall, and a tunnel top wall;
      a first curved end located at a first end of the inner bottom wall section; and
      a second curved end located at a second end of the inner bottom wall section;
   wherein the bottom section of the tank is configured to nest against the frame of the agricultural machine with the first and second curved ends of the inner bottom wall section corresponding to a first curved edge and a second curved edge of portions of the frame of the agricultural machine; and
   wherein a plurality of hoses is routed through the depression defined by the routing tunnel from a first end of the agricultural machine to a second end of the agricultural machine.

10. The tank of claim 9, further comprising a plurality of brackets mounted to a top wall of a frame side-rail of the frame of the agricultural machine.

11. The tank of claim 10, wherein the plurality of brackets nest within the depression; and
   wherein the plurality of hoses is routed through the plurality of brackets.

12. The tank of claim 9, wherein the plurality of hoses is supported by a top wall of a frame side-rail of the frame of the agricultural machine.

13. A tank system with a hose routing system of an agricultural machine comprising:
   a tank comprising:
      a tank outer wall;
      a tank inner, curved wall;
      an outer bottom wall section that extends inwardly from the tank outer wall;
      a depression formed in the outer bottom wall section to form a channel;
      an inner bottom wall section that extends outwardly from the tank inner, curved wall;
      an upright side segment that extends upwardly from the inner bottom wall;
      a first curved end located at a first end of the upright side segment; and
      a second curved end located at a second end of the upright side segment;
   a plurality of hoses that extend from a first end of the agricultural machine to the second end of the agricultural machine; and
   a plurality of brackets mounted on a top wall of a frame side-rail of the agricultural machine,
   wherein the outer bottom wall section has a base on one side of the depression and a lip on the other side of the depression;
   wherein the base is supported by an outer portion of the top wall of the frame side-rail; and
   wherein the lip is supported by an inner portion of the top wall of the frame side-rail.

14. The system of claim 13, wherein the hoses are routed within the brackets.

15. The system of claim 13, wherein the brackets nest within the channel.

16. The system of claim 13, wherein the plurality of hoses is supported by the top wall of the frame side-rail.

17. The system of claim 13, wherein the plurality of hoses is routed between the tank and the frame side-rail.

* * * * *